INVENTORS
OSCAR F. WIEDEMAN
KENNETH W. SAUNDERS
MICHAEL N. O'CONNOR
BY Lawrence W. Flynn
AGENT United States Patent Office 3,695,833
Patented Oct. 3, 1972

3,695,833
PRODUCTION OF ALKALI METAL FERROCYANIDE
Oscar Fontaine Wiedeman, New Orleans, La., and Kenneth Worden Saunders, Darien, and Michael Niall O'Connor, Norwalk, Conn., assignors to American Cyanamid Company, Stamford, Conn.
Continuation of abandoned application Ser. No. 823,672, May 12, 1969. This application June 16, 1971, Ser. No. 153,861
Int. Cl. C01c *3/10, 3/12;* C01g *49/10*
U.S. Cl. 423—367                                 14 Claims

ABSTRACT OF THE DISCLOSURE

An aqueous alkali metal cyanide solution is reacted with a solution of ferrous chloride in the presence of free alkali metal hydroxide. This produces a solution of alkali metal ferrocyanide and alkali metal chloride and a precipitate of iron hydroxide, which is filtered off. The filtrate is evaporated to give crystals of alkali metal ferrocyanide, preferably under vacuum, and at solution temperatures at which anhydrous alkali metal ferrocyanide will not form; the resulting crystals of alkali metal ferrocyanide are separated and dried.

This is a continuation of my copending application Ser. No. 823,672, filed May 12, 1969, now abandoned.

BACKGROUND OF THE INVENTION

This invention relates to a method for the production of alkali metal ferrocyanides such as sodium or potassium ferrocyanide. Its principal object is to provide a method that is particularly well adapted to large scale commercial production, in a single reaction stage, of alkali metal ferrocyanide solutions of good purity from which the hydrated alkali metal ferrocyanide crystals of commerce can be recovered directly.

A further object is to provide a method that will produce alkali metal ferrocyanide liquors that also have a high content of alkali metal chloride thereby assisting in salting out the desired crystalline products.

A still further object is the provision of a method wherein high reactor loadings and reaction product liquors of high ferrocyanide content can be obtained by the use of relatively high reaction temperatures without decreasing the purity of the products or encountering difficult filtration problems.

Other objects and advantages of the invention will become apparent from the following description of preferred embodiments thereof when taken with the accompanying drawing and the appended claims.

Sodium ferrocyanide has heretofore been produced commercially by heating together in aqueous solution (i) crude sodium cyanide containing some calcium salts, (ii) sodium carbonate, and (iii) ferrous sulfate. This forms the soluble sodium and calcium ferrocyanides while calcium sulfate and calcium carbonate are precipitated. Additional sodium carbonate is added and the slurry is filtered. The filtration is difficult. The filtrate is concentrated and sodium ferrocyanide decahydrate is crystallized. The process is described in Chemical Engineering, vol. 60, No. 2 (February 1953) at pages 240–243.

Potassium ferrocyanide is produced by first adding potassium chloride to the above-described sodium and calcium ferrocyanide solution. This forms the nearly insoluble double salt, potassium calcium ferrocyanide, which is separated by filtration and heated with an aqueous solution of potassium carbonate. This precipitates calcium carbonate, which is removed by settling and filtration, and potassium ferrocyanide trihydrate is crystallized from the filtrate.

SUMMARY OF THE INVENTION

We have found a straightforward and commercially feasible process for the production of alkali metal ferrocyanides that is much simpler than those previously used and that avoids the difficult filtrations involved therein. This process is based on the concept of reacting together in aqueous solution an alkali metal cyanide and ferrous chloride under suitable reaction conditions to form a solution containing alkali metal ferrocyanide and alkali metal chloride.

We have found that when this reaction is carried out in the presence of free alkali metal hydroxide, there is obtained directly an alkali metal ferrocyanide solution that is remarkably free both from cyanide polymers and from iron compounds that could form colored impurities upon oxidation. The solution also has a high content of dissolved alkali metal chloride which assists in salting out the desired hydrated alkali metal ferrocyanide products in crystalline form.

We have also found, as one of the most important features of our invention, that any unreacted ferrous or ferric iron, which would otherwise remain in the alkali metal ferrocyanide solution to form Prussian Blue or other colored impurities, are precipitated as iron hydroxides in an easily filterable form by the free alkali metal hydroxide present, and can therefore be removed by a simple filtration.

The process of our invention, therefore, consists generally in reacting in solution an alkali metal cyanide such as sodium or potassium cyanide with ferrous chloride in the molar proportions hereinafter described and in the presence of free alkali metal hydroxide, employing the reaction conditions and the procedural steps described hereinbelow whereby crystals of alkali metal ferrocyanide hydrate are recovered from the resulting solution and dried.

Reactant ratios

The optimum ratios of reactants to be used in producing alkali metal ferrocyanides by the process of our invention are most easily described in terms of the materials charged to the reactor. These materials are (i) aqueous alkali metal hydroxide solution, (ii) hydrocyanic acid, which is preferably liquid HCN, and (iii) ferrous chloride, and they are preferably charged in the order named. We find that the advantages listed below are obtained when these are brought together in the following molar proportions:

(a) The mole ratio of HCN to $FeCl_2$ should be not greater than about 6.1 to 1 and not less than about 5.7 to 1; while (b) The mole ratio of alkali metal hydroxide to $FeCl_2$ should not be less than 6.0 to 1 and preferably within the range of about 6.1 to 1 to about 6.5 to 1 and should always be sufficient to maintain a pH of at least 10 in the reaction products. Excess free alkali above the 6.5:1 ratio does not harm the process, but is not necessary.

Advantages of free alkali in solution

The following important advantages are obtained by the presence of free alkali in the reaction solution:

(1) It prevents hydrolysis and polymerization of hydrocyanic acid;

(2) It ensures complete precipitation of all unreacted iron, whether ferrous or ferric, that would otherwise be present in the alkali metal ferrocyanide liquors; therefore, (3) It prevents formation of ferrous ferrocyanide, $Fe_2Fe(CN)_6$ and other similar color-forming impurities, even at relatively high reaction temperatures.

The first of these advantages centers about the fact that free HCN can be released when an acid material such as ferrous chloride is added to an alkali metal cyanide, unless an alkaline pH is maintained. This free HCN can polymerize and/or form undesirable colorations of HCN polymers or iron reaction products. Free HCN polymerizes readily, unless there is an excess of base over cyanide; however, the evolution and polymerization of HCN is prevented by the maintenance of an alkaline pH. This is the first of the reasons why the process of our invention provides an excess of alkali metal hydroxide when it is mixed with hydrocyanic acid to form alkali metal cyanide.

A second reason is that when ferrous chloride is mixed with alkali metal cyanide solution, an excess of base is desirable to prevent the formation of ferrous ferrocyanide as shown below:

$$Fe(CN)_6{-}{-}{-}{-} + 2Fe^{++} \rightarrow Fe_2Fe(CN)_6$$

This compound is an insoluble white material, which oxidizes rapidly to Prussian blue on exposure to air.

Although the chemistry of the iron cyanides is very complex, we have found that none of the color-forming double iron salts are formed in our process when an excess of base is maintained at all times. Both ferrous and ferric hydroxide are very insoluble, so that an excess of base effectively removes both types of ions from the reaction products by precipitation as readily filterable insoluble hydroxides.

BRIEF DESCRIPTION OF THE DRAWINGS

The process of our invention will now be described in further detail with reference to the accompanying drawing, within.

DESCRIPTION OF THE PREFERRED EMBODIMENTS

The process will be described with particular reference to the production of tetrasodium ferrocyanide decahydrate, which is sold commercially as yellow prussiate of soda, but it will be understood that the principles involved are equally applicable to the production of potassium ferrocyanide hydrate and other alkali metal ferrocyanides.

Figure 1:
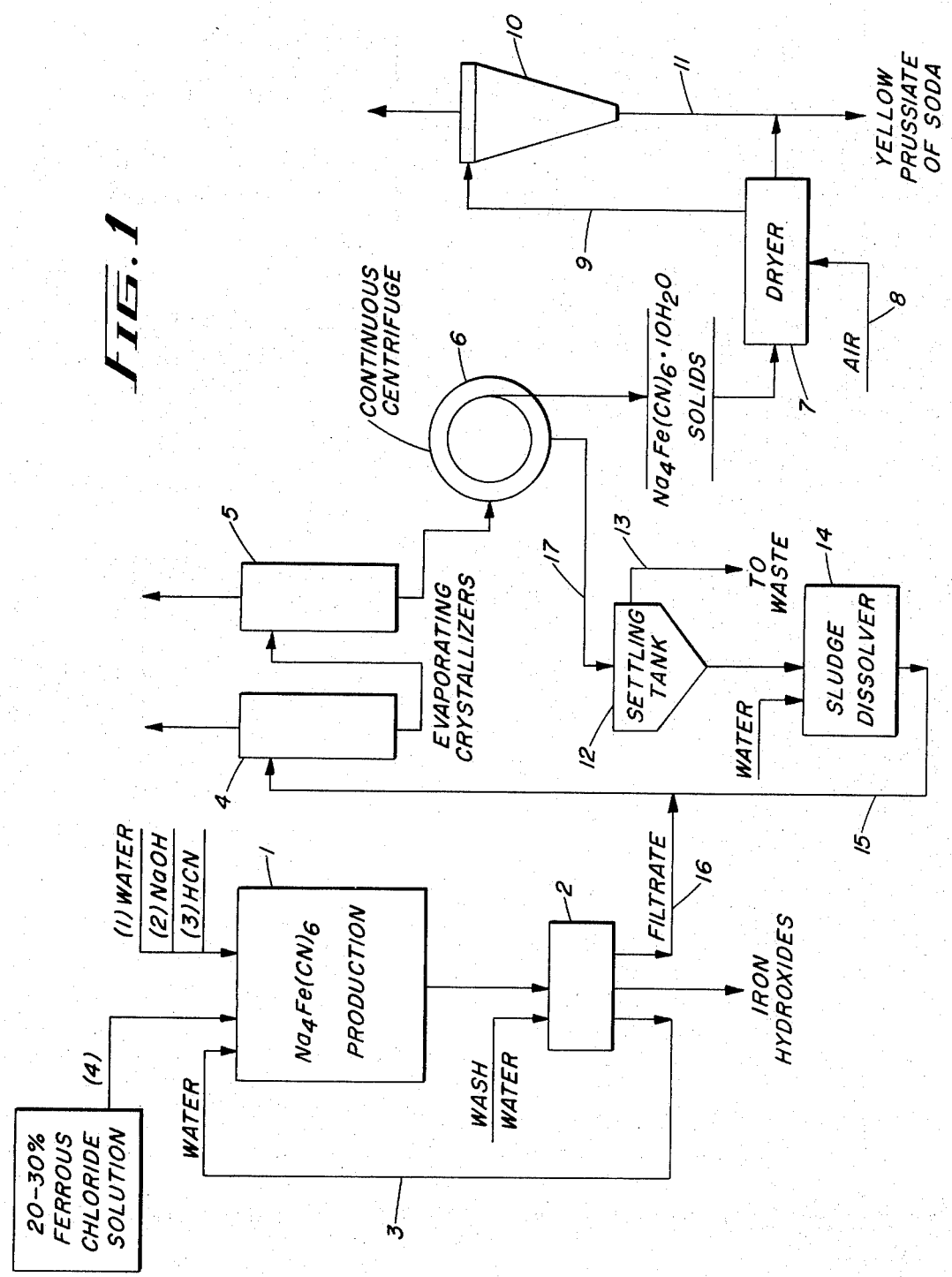
FIG. 1 is a schematic flow sheet of the process.

Referring now to FIG. 1, the first step in the overall process is the preparation of the sodium ferrocyanide. This is shown as being carried out in a single reactor 1, although it will be readily apparent that a separate reaction vessel could be used to prepare the sodium cyanide separately instead of preparing it in situ as shown in FIG. 1.

In the process shown, reactor 1 is first charged with a heel of water, which may be wash water from filter 2 introduced through line 3. Sodium hydroxide is then added, preferably as 50% NaOH solution, in a quantity such that its mole ratio to the HCN used is preferably between about 1:01:1 and about 1.14:1. The hydrocyanic acid is then introduced. An inert gas such as nitrogen is preferably kept flowing through the HCN lines and through the reaction vessel, and it is desirable to keep the temperature below about 50° C. during this stage in order to prevent hydrolysis and color formation. The hydrocyanic acid is preferably introduced as liquid HCN and is fed into the reactor below the surface of the sodium hydroxide solution. The HCN can also be introduced as an aqueous solution thereof. As soon as the required amount of HCN has been added, the lines are preferably purged with nitrogen.

After the calculated amount of HCN has been added, ferrous chloride solution is pumped in while maintaining the reaction temperature within the range of about 50–90° C. and preferably about 80–90° C. The quantity of ferrous chloride is preferably such that the mole ratio of NaOH to $FeCl_2$ is at least 6 to 1, for reasons that are explained above. After all of the ferrous chloride solution has been added, the pH of the solution should be above 10 and preferably above 10.5–11, and there should be a gelatinous precipitate of iron hydroxide present. If desired, the batch may be heated at about 80–90° C. until the gelatinous flocs of ferrous hydroxide and/or ferric hydroxide are dispersed.

A small sample of the reaction product may be withdrawn at this point and blown with air to be sure that the reactants are added in the desired ratios. If the pH is too low, a blue coloration will appear, and more sodium hydroxide solution should be added to the batch until no blue color is obtained when air is bubbled through a sample.

The batch is then filtered on filter 2, which is preferably a filter press containing a cotton or a polypropylene filter cloth coated with a filter aid. The batch should be pumped through the filter at a temperature higher than that at which any of the dissolved sodium ferrocyanide or sodium chloride will precipitate. Thus when the conditions described in the following example are used the filtration temperature should be above about 60° C.

The iron hydroxides (i.e., predominantly ferrous hydroxide which may also contain small amounts of ferric hydroxide) that separate on the filter cloth are discharged to waste, while the filtrate is passed to the second stage of the process. In this stage it is first concentrated in evaporating crystallizers 4 and 5 and the resulting crystals are separated from the mother liquor in preferably continuous centrifuge 6. The crystals recovered from the basket of centrifuge 6 are fed to dryer 7, where their surface moisture is removed by contact with a stream of air introduced through line 8. Gases from dryer 7 are passed through line 9 into cyclone separator 10, where solid fines are separated and removed through line 11. These fines may be mixed with dry crystals from dryer 7 and the mixture bagged and sold as yellow prussiate of soda.

The liquor from centrifuge 6 usually has a substantial content of ferrocyanide solids. It is therefore passed through line 17 to settling tank 12 where these solids are settled out as a sludge, the supernatant salt solution being passed to waste through line 13. The sludge is dissolved in water in sludge dissolving tank 14 and is then recycled to the evaporators through line 15. This stream is preferably mixed with the stream of filtrate leaving filter 2 through line 16, as shown on the drawings.

The function of evaporators 4 and 5 is to remove free water from the sodium ferrocyanide solution without, however, removing any water of hydration. This may be done either by evaporating water at the boiling point of the solution at atmospheric pressure to the critical concentration and then cooling, or by distilling out water at reduced pressures and temperatures. Upon evaporating at atmospheric pressure the product is anhydrous sodium ferrocyanide, and this must be hydrated to the decahydrate by contact with residual water on cooling. With reduced pressures such that the solution temperature is below 81.5° C. the crystalline product is always the decahydrate; i.e., yellow prussiate of soda. When potassium ferrocyanide trihydrate is being produced, the corresponding critical temperature is 87.3° C. In both cases, the reduced pressure distillation is preferred.

In the process shown, the first stage evaporator 4 is preferably operated with a liquid temperature of 55° C. The feed to evaporator 4 in this case contains by weight 19.6% sodium ferrocyanide, 7.77% sodium chloride, 1.23% sodium hydroxide and 71.4% water. The presence of sodium hydroxide reduces the solubility of the sodium chloride, so that salt will begin to precipitate out when it reaches about 23 percent concentration in the mother liquor at 20° C. At this temperature, and assuming that the concentration of the NaOH has increased by water evaporation to 3.4%, the eutectic has a composition very close to 22.5% sodium chloride and 0.5% sodium ferrocyanide. This eutectic composition for the mother liquor must not be exceeded if high purity product is to be assured.

For purposes of achieving product purity, it is better to avoid sodium chloride concentrations above 21% in the effluent mother liquor from the second stage. The first stage is therefore so operated at 55° C. that the effluent stream is 71% of the feed stream and the water evaporated is 29% of the feed. The sodium ferrocyanide content in the effluent from the first stage will then be 27.6%, and the second stage is preferably operated at 20° C. to the point where its concentration is 30%. This avoids sodium chloride precipitation while reducing the solubility of the ferrocyanide product in the mother liquor to below 1%.

Dryer 7 is also preferably operated at relatively low temperatures to avoid dehydration of decahydrate crystals. Preferably, a fluidized solids dryer is employed with air being introduced through line 8 at about 120° F. and dryer temperatures of 100° F. being maintained. Dry products obtained as fines from the cyclone in line 11 can be mixed with the product crystals from dryer 7.

Figure 2:
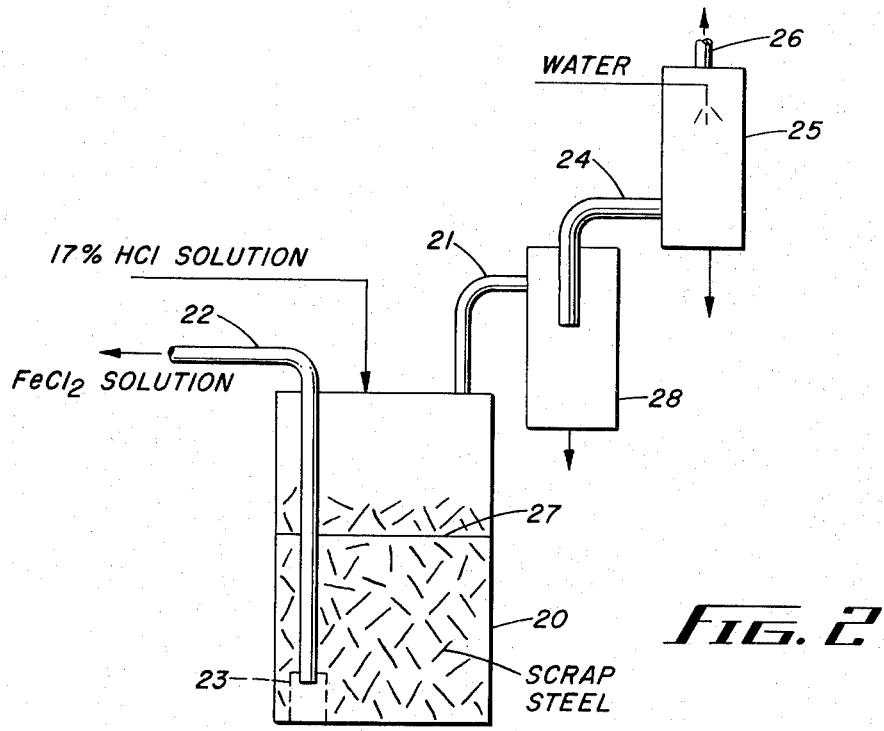
FIG. 2 is a diagramatic illustration of equipment useful for preparing the ferrous chloride solution.

FIG. 2 shows a preferred method of preparing the ferrous chloride solution added to the reactor. This process is based on the addition of aqueous hydrochloric acid to pieces of iron or steel. Scrap steel from sheet metal is readily available, and is therefore a preferred material, although it will be understood that scrap iron could be used with equally good results.

The main constituents of steel, other than iron, are 0.1–0.3% of carbon, 0.3–1.0% of manganese and small amounts of phosphorus and sulphur. The carbon is present as cementite ($Fe_3C$) and this reacts with hydrochloric acid to produce ferrous chloride, hydrogen, and hydrocarbons which are in the oil range.

Referring to the drawing, scrap steel of this character is charged to reactor 20, which is a tank made of or lined with acid-resistant material. Outlet pipe 21 for hydrogen gas and discharge pipe 22 having a screen 23 surrounding its lower end are provided as well as an inlet for aqueous hydrochloric acid solution. Pipe 21 preferably leads to trap 28 for the collection of mist carried over from the reaction; this trap is surmounted by exit pipe 24 which connects to scrubbing tower 25. Hydrogen gas leaving this tower through pipe 26 is vented or burned in a flare.

Suitable results are obtained when reactor 20 is charged with steel scrap to a level well above acid level 27. The strength of the hydrochloric acid used will depend primarily on the concentration of ferrous chloride solution desired, but should be at least 10% HCl (by weight) and preferably not higher than 25% HCl (by weight) so that the precipitation of solid $FeCl_2$ at low temperatures is avoided. The process may be conducted either as a batch reaction or continuously; in the latter case, a stream of hydrochloric acid feed is continuously introduced and ferrous chloride is continuously withdrawn through pipe 22 at an equivalent rate.

While the above procedure describes a method for preparing a suitable ferrous chloride solution, purchased ferrous chloride solution or other equivalent solutions of ferrous chloride such as, for example, the effluent from a hydrochloric acid steel pickling operation, could likewise be used.

Figure 3:
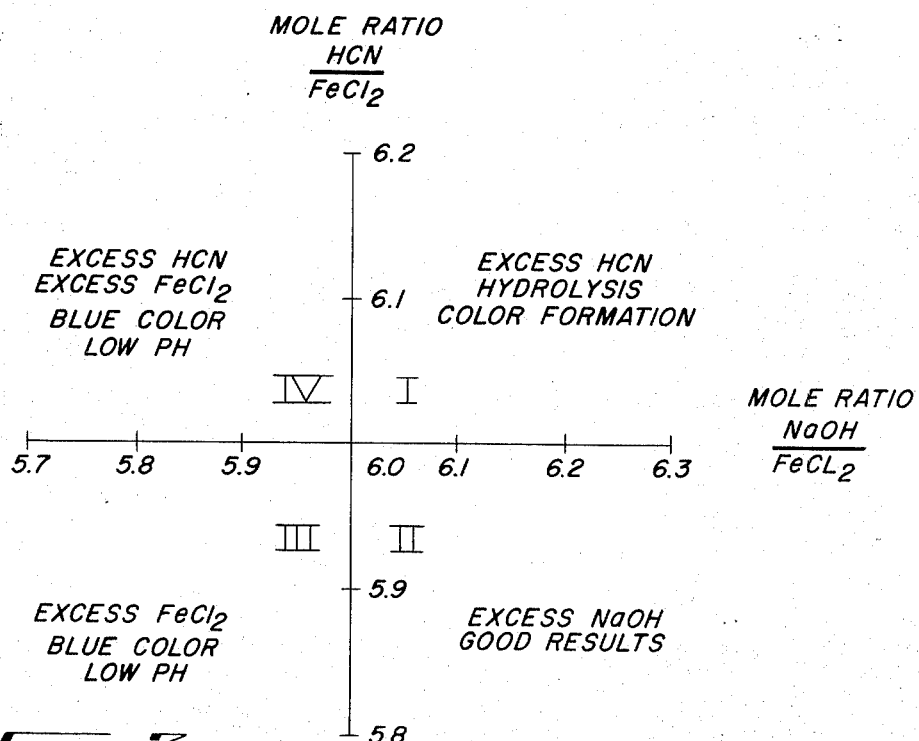
FIG. 3 is a chart showing the mole ratios of reactants to be used and the difficulties encountered when these ratios are not used.

FIG. 3 is a chart showing the optimum mole ratios of the reactants to be introduced into reactor 1 of FIG. 1. In this chart, the quadrants are numbered clockwise, and the process of the invention is preferably carried out by operating in quadrant II; that is to say, with from 5.8 to 6.0 moles of HCN (or of NaCN) for each mole of $FeCl_2$ and with from 0.1 to 0.3 or more moles of free NaOH for each mole of $FeCl_2$ when a 6.0:1 mole ratio of HCN to $FeCl_2$ is used. When the operation is in quadrant I, there is an excess of HCN which may undergo hydrolysis or may polymerize with the formation of colored impurities in the sodium ferrocyanide product. In quadrant IV, there is both an excess of HCN, which produces the same disadvantage as in quadrant I, and also an excess of ferrous chloride which can develop the blue impurities. This disadvantage is also encountered in quadrant III wherein there is insufficient sodium cyanide to react with all of the ferrous chloride.

When the operation is in quadrant II, it is essential to achieve a pH higher than 10.0 and preferably above 10.5 in the solution leaving reactor 1 in order to avoid the formation of blue colored impurities. This can be ensured by operating with at least 0.1 mole of free sodium hydroxide, although a smaller amount might be acceptable when the ratio of HCN to $FeCl_2$ is between 5.8 and 5.9. When operating on a plant scale, however, it is advisable to maintain a pH of at least 11.0 in the reacted sodium ferrocyanide liquors as a convenient way to minimize impurity formation.

The invention will be further described and illustrated by the following specific example. It should be understood, however, that although this example may describe some of the preferred features of the invention, it is given primarily by way of illustration and to complete the disclosure, and the invention in its broader aspects is not limited thereto.

EXAMPLE

Referring first to FIG. 2 of the drawings, reactor 20 is loaded with a large excess of steel scrap at 20° C. and a 17% aqueous hydrochloric acid of the same temperature is added. When all of the acid has reacted, a ferrous chloride solution having an $FeCl_2$ content of 26.3% by weight and a pH of 3.5 is withdrawn.

The sodium ferrocyanide reactor 1 of FIG 1 of the drawings is first charged with a heel of 57.5 pounds of water. Then 54.8 pounds of NaOH are added as a 50% aqueous solution. The reactor and pipes are blanketed with a stream of nitrogen as 34.1 pounds of liquid HCN are introduced through a pipe extending below the surface of the alkali solution at a rate to maintain the batch temperature below 50° C. The final pH should be measured carefully; if there is no excess HCN present it will be above 12.2

The ferrous chloride solution (26.3%) is then introduced at a rate such as to maintain the temperature of the reaction mixture between about 80° C. and 90° C. A total of about 103 pounds of solutions (27.1 pounds of $FeCl_2$) is introduced. The addition is followed carefully by pH measurements, and is stopped when the pH is still 10.5–11 or slightly higher. The mole ratios of the reagents can be adjusted to those shown in quadrant II on FIG. 3 of the drawings, if necessary, by appropriate addition of one or more of the reactants at this point. The only facts required are the pH, the knowledge that an excess of base over HCN was used in the sodium cyanide preparation, and the observation that a precipitate of iron hydroxide is present.

The batch is then filtered on filter 2, which is preferably precoated with a filter aid. Additional filter aid is also advantageously suspended in the ferrocyanide solution being filtered in amounts of about 1.6 pounds per 100 pounds of solution. A steam jacketed filter is preferably used so that the temperature of the solution will remain above 60° C.

Increased filter rates are obtained when mole ratios of HCN to $FeCl_2$ within the range of 5.95:1 to 6.0:1 are used in the reactor since these ratios reduce materially the amount of suspended solids. Thus at a mole ratio of HCN to $FeCl_2$ of 5.98:1, the amount of iron hydroxides (ferrous plus ferric) is only about 0.15% of the weight of the ferrous chloride used.

The filtrate, which weighs 328.3 pounds and contains 63.2 pounds of sodium ferrocyanide, is concentrated in evaporating crystallizers 4 and 5 to a crystal slurry having the following composition:

|  | Liquid phase, pounds | Solid phase |
|---|---|---|
| Water | 93.6 | 101 pounds of $Na_4Fe(CN)_6 \cdot 10H_2O$. |
| NaCl | 23.6 | |
| NaOH | 4.2 | |
| Sodium ferrocyanide | 0.9 | |

The first stage evaporator 4 is operated under a partial vacuum sufficient to maintain a temperature of 55° C. in the liquor being evaporated as 101 pounds of water are removed. The second stage 5 is operated at 20° C. to produce the crystal slurry described above. This is fed to centrifuge 6 which discharges crystals containing about 3 percent of surface moisture. These are dried by contact with a rising flow of air admitted at a temperature of 120° F. Dust entrained in this air is separated in cyclone separator 10; it weighs 0.5 pound and may be either mixed with the product or added to sludge dissolver 14.

The final product is 98.5 pounds of yellow prussiate of soda. This represents an overall yield of better than 99 percent. This product contains less than 0.3% of NaCl. It can be used to produce pigments of high quality known to the trade as "iron blues," and for other commercial uses.

The liquid from centrifuge 6 contains about 1 percent of suspended sodium ferrocyanide decahydrate fines. These are separated as a sludge in settling tank 12; they are then redissolved in water and the solution passed to the evaporating crystallizers. Fines from cyclone 10 may be added to this solution in dissolving tank 14 if desired.

We claim:
1. A method of producing alkali metal ferrocyanide which comprises reacting in aqueous solution ferrous chloride with alkali metal cyanide, and in a proportion within the range of from about 5.7 to 6.1 moles of the cyanide for each mole of the ferrous chloride and in the presence of free alkali metal hydroxide in an amount sufficient to maintain a pH above 10 in the solution, thereby producing alkali metal ferrocyanide and alkali metal chloride in solution and a precipitate of iron hydroxide, filtering off the iron hydroxide, and recovering alkali metal ferrocyanide from the filtrate.

2. A method according to claim 1 wherein the ratio of moles of alkali metal cyanide plus free alkali metal hydroxide to moles of ferrous chloride is within the range of from about 6.0 to 1 to about 6.5 to 1 and is such that the pH of the reaction product solution is above 10.5.

3. A method according to claim 1 wherein the reaction is carried out at a temperature between 90° C. and the crystallization temperature of the alkali metal ferrocyanide being produced.

4. A method according to claim 1 wherein the filtrate is concentrated and alkali metal ferrocyanide is crystallized at temperatures below its dehydration temperature, whereby crystals of alkali metal ferrocyanide hydrate are obtained.

5. A method according to claim 1 wherein the aqueous ferrous chloride solution is prepared by contacting iron or steel with an aqueous hydrochloric acid solution containing from about 10% to about 25% by weight hydrochloric acid.

6. A method of producing sodium ferrocyanide according to claim 1 which comprises reacting ferrous chloride with sodium cyanide in a solution containing sufficient free sodium hydroxide to form a reaction product solution having a pH above 10, the proportion of reactants being within the range of from 5.7 to 6.1 moles of sodium cyanide for each mole of ferrous chloride at reaction temperature between about 50° and 90° C., whereby sodium ferrocyanide and sodium chloride are produced in solution and a precipitate of iron hydroxides is formed, filtering off the iron hydroxides, and recovering sodium ferrocyanide from the filtrate.

7. A method according to claim 6 wherein the ratio of moles of sodium cyanide plus free sodium hydroxide to moles of ferrous chloride is within the range of from about 6.0 to 1 to about 6.5 to 1 and is such that the pH of the reaction product solution is above 10.5.

8. A method according to claim 6 wherein the filtrate is concentrated and sodium ferrocyanide is crystallized at a temperature below 81.5° C., whereby crystals of sodium ferrocyanide decahydrate are obtained and the crystals are separated from their mother liquor and dried.

9. A method of producing sodium ferrocyanide decahydrate crystals which comprises preparing an alkaline aqueous sodium cyanide solution by reacting one mole of HCN with from about 1.02 to about 1.14 moles of sodium hydroxide, adding about six moles of ferrous chloride, reacting at about 80° C.–90° C. to produce a solution containing sodium ferrocyanide and sodium chloride and a precipitate of iron hydroxides, filtering off the iron hydroxides, evaporating water from the filtrate at a solution temperature below 81.5° C. and thereby producing crystals of sodium ferrocyanide decahydrate, terminating the water evaporation while the concentration of sodium chloride in the solution is below 22.5 percent whereby crystals of sodium ferrocyanide which are substantially free from sodium chloride are obtained, separating the crystals from their mother liquor, and drying the crystals.

10. A method of producing alkali metal ferrocyanide which comprises reacting in aqueous solution ferrous chloride with alkali metal cyanide, and in a proportion within the range of from about 5.7 to 6.1 moles of the cyanide for each mole of the ferrous chloride and in the presence of free alkali metal hydroxide in an amount sufficient to maintain a pH above 10 in the solution, thereby producing alkali metal ferrocyanide and alkali metal chloride in solution and a precipitate of iron hydroxide.

11. A method of producing sodium ferrocyanide according to claim 1 which comprises reacting ferrous chloride with sodium cyanide in a solution containing sufficient free sodium hydroxide to form a reaction product solution having a pH above 10, the proportion of reactants being within the range of from 5.7 to 6.1 moles of sodium cyanide for each mole of ferrous chloride at reaction temperature between about 50° and 90° C. whereby sodium ferrocyanide and sodium chloride are produced in solution and a precipitate of iron hydroxides is formed.

12. A method according to claim 10 wherein the ratio of moles of alkali metal cyanide plus free alkali metal hydroxide to moles of ferrous chloride is within the range of from about 6.0 to 1 to about 6.5 to 1 and is such that the pH of the reaction product solution is above 10.5.

13. A method according to claim 10 wherein the reaction is carried out at a temperature between 90° C. and the crystallization temperature of the alkali metal ferrocyanide being produced.

14. A method according to claim 11 wherein the ratio of moles of sodium cyanide plus free sodium hydroxide to moles of ferrous chloride is within the range of from about 6.0 to 1 to about 6.5 to 1 and is such that the pH of the reaction product solution is above 10.5.

References Cited

UNITED STATES PATENTS

| | | | |
|---|---|---|---|
| 1,143,952 | 6/1915 | Freeman | 23—79 |

FOREIGN PATENTS

| | | | |
|---|---|---|---|
| 664,756 | 6/1964 | Italy | 23—79 |

OSCAR R. VERTIZ, Primary Examiner

H. S. MILLER, Assistant Examiner

U.S. Cl. X.R.

423—499, 633